United States Patent
Wang et al.

(10) Patent No.: US 11,665,567 B2
(45) Date of Patent: May 30, 2023

(54) ADAPTIVE CSI REPORTING FOR CARRIER AGGREGATION

(71) Applicant: Telefonaktiebolaget LM Ericsson (publ), Stockholm (SE)

(72) Inventors: Min Wang, Luleå (SE); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 210 days.

(21) Appl. No.: 16/968,362

(22) PCT Filed: Jan. 24, 2019

(86) PCT No.: PCT/EP2019/051787
§ 371 (c)(1),
(2) Date: Aug. 7, 2020

(87) PCT Pub. No.: WO2019/158336
PCT Pub. Date: Aug. 22, 2019

(65) Prior Publication Data
US 2021/0092625 A1    Mar. 25, 2021

Related U.S. Application Data

(60) Provisional application No. 62/631,309, filed on Feb. 15, 2018.

(51) Int. Cl.
    *H04W 24/10*       (2009.01)
    *H04B 7/06*        (2006.01)
    (Continued)

(52) U.S. Cl.
CPC .......... *H04W 24/10* (2013.01); *H04B 7/0626* (2013.01); *H04B 7/0632* (2013.01); *H04L 41/0677* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 2010/0279679 A1* | 11/2010 | Young | ............... | H04W 36/0085 455/423 |
| 2011/0098004 A1* | 4/2011 | Takaoka | ............... | H04L 25/0224 455/67.11 |

(Continued)

FOREIGN PATENT DOCUMENTS

| | | | | |
|---|---|---|---|---|
| EP | WO 2017/162287 A1 * | 3/2016 | ........... | H04B 17/382 |
| WO | 2017162287 A1 | 9/2017 | | |

OTHER PUBLICATIONS

PCT International Search Report and Written Opinion dated Apr. 11, 2019 for International Application No. PCT/EP2019/051787, 13 pages.

(Continued)

*Primary Examiner* — Jeffrey M Rutkowski
*Assistant Examiner* — Ning Li
(74) *Attorney, Agent, or Firm* — Sage Patent Group

(57) ABSTRACT

Techniques are disclosed for adapting measurement reporting in a wireless communication network (10) employing carrier aggregation. In order to reduce beam link failures, the UE (200, 500) is configured to adapt measurement reporting for a serving cell (20) depending on a beam link quality of one or more serving downlink beams in the serving cell (20). For example, measurement reporting can be adapted by modifying a reporting frequency at which measurements for one or more downlink beams are sent, by varying a number of non-serving downlink beams for which measurements are sent, or both.

15 Claims, 17 Drawing Sheets

(51) Int. Cl.
*H04L 41/0677* (2022.01)
*H04W 74/08* (2009.01)
*H04B 7/0417* (2017.01)

(56) References Cited

U.S. PATENT DOCUMENTS

| | | | |
|---|---|---|---|
| 2014/0177601 A1* | 6/2014 | Nishio | H04W 52/146 |
| | | | 370/332 |
| 2015/0249998 A1* | 9/2015 | Long | H04W 72/1284 |
| | | | 370/329 |
| 2016/0105817 A1 | 4/2016 | Frenne et al. | |
| 2017/0026094 A1* | 1/2017 | Milleth | H04B 7/086 |
| 2018/0220318 A1* | 8/2018 | Uemura | H04B 17/318 |
| 2019/0053193 A1* | 2/2019 | Park | H04L 5/0091 |
| 2019/0081739 A1* | 3/2019 | Nammi | H04L 1/08 |
| 2020/0059807 A1* | 2/2020 | Fan | H04B 7/0632 |
| 2020/0374960 A1* | 11/2020 | Deenoo | H04W 72/1284 |

OTHER PUBLICATIONS

Ericsson, 3GPP TSG-RAN WG2 Meeting #100 on NR; R2-1713598, "Remaining Issues of Email Discussion # 20 on Measurement Reporting", Reno, USA, Nov. 27-Dec. 1, 2017, 12 pages.

\* cited by examiner

ADAPTIVE CSI REPORTING FOR CARRIER AGGREGATION

CROSS-REFERENCE TO RELATED APPLICATIONS

This application is a 35 U.S.C. § 371 national stage application for International Application No. PCT/EP2019/051787, entitled "ADAPTIVE CSI REPORTING FOR CARRIER AGGREGATION", filed on Jan. 24, 2019, which claims priority to U.S. Provisional Application Ser. No. 62/631,309, filed on Feb. 15, 2018, the disclosures and contents of which are hereby incorporated by reference in their entireties.

TECHNICAL FIELD

The present disclosure relates generally to wireless communication networks using carrier aggregation and beam forming and, more particularly, to channel state information (CSI) reporting in wireless communication networks using carrier aggregation and measurement reporting.

BACKGROUND

Fifth Generation (5G) systems, also known as Next Radio (NR) systems, will employ carrier aggregation (CA) to support high data rate transmissions. In carrier aggregation, multiple component carriers are aggregated to increase the bandwidth for transmission to or from a user equipment (UE). For NR systems, up to 32 component carriers can be aggregated to provide wider bandwidths for higher data rate transmissions. The component carriers do not have to be contiguous in frequency.

With carrier aggregation, a user equipment is assigned one primary downlink component carrier and one primary uplink component carrier. The primary component carriers are referred to as primary cells (PCells). In addition to the PCells, a UE may be assigned one or more secondary component carriers for the downlink, and/or one or more secondary component carriers for the uplink. The secondary component carriers are referred to as secondary cells (SCells). Generally, downlink control information (DCI) is transmitted to the UE on the Physical Downlink Control Channel (PDCCH) in the PCell. Uplink control information (UCI) is transmitted from the UE to the network on the physical uplink control channel (PUCCH) associated with the uplink PCell.

NR systems will also make extensive use of beam forming to improve coverage and reduce interference. Beam forming is a multiple antenna technology that enables the base station and UE to transmit and receive narrowly focused beams. Thus, beam forming enables the base station to re-use radio resources by transmitting signals to different UEs in different directions. By utilizing a large number of antenna elements at both the base station and the UE, along with intelligent beam forming and beam tracking algorithms, the network is able to provide greater coverage and reduce interference, which in turn increases spectral efficiency.

When beam forming is used, the UEs typically monitor the beam quality of the downlink beams and send measurement reports to the base station indicating the beam link quality of the serving downlink beams and non-serving downlink beams. When the beam quality of a serving downlink deteriorates, the base station can instruct the UE to switch to a different downlink beam. A beam failure is declared when the beam link quality of a serving downlink beam falls below a threshold. In the event of a beam failure, the UE performs a contention-free random access to re-establish the link with the base station.

For the beam failure recovery procedure, dedicated Physical Random Access Channel (PRACH) resources are assigned to the UE so that the UE can perform a contention-free random access in the PCell. If there are no dedicated PRACH resources configured for the UE, the UE performs a contention-based random access. Due to limitations in the Medium Access Control (MAC), there is currently no beam failure recovery procedure for a SCell. This means that the UE would either need to perform the beam failure recovery procedure in the PCell, or rely on existing reporting procedures to recover from the beam link failure. It is inefficient to perform a random access on the PCell to recover from a beam link failure on the SCell. Relying on random access-based recovery procedures in the PCell could overload the PCell where there are a large number of CA-capable UEs. The alternative is to rely on current reporting procedures. In the event of a beam failure on the SCell, the UE could continue to send measurement reports to the base station in the PCell. In this case, the base station may determine, based on the measurement reports, that the UE is in a beam link failure and order the UE to switch downlink beams. However, the measurement report may be infrequently triggered, so that the UE may take a long time to recover from a beam link failure, which would negatively affect the Quality of Services (QoS).

Accordingly, there is a need for mechanisms to reduce the number of beam failures in secondary cells in order to reduce the overhead load on the uplink PCell.

SUMMARY

Techniques are disclosed for measurement reporting in a wireless communication network employing carrier aggregation and beam forming. In order to reduce beam link failures, the UE is configured to adapt channel state information (CSI) reporting for a serving cell depending on a beam link quality of one or more serving downlink beams in the serving cell. The serving cell may comprise a PCell or a SCell. For example, measurement reporting can be adapted by modifying a reporting frequency at which the measurement reports are set and/or by varying a number of non-serving downlink beams for which measurements are sent, or both.

Exemplary embodiments of the disclosure comprise methods of CSI reporting performed by a UE. In one embodiment, the UE receives downlink transmissions from the serving cell on one or more serving downlink beams of the serving cell. The UE sends measurement reports according to a UE-specific CSI configuration for the serving cell. The measurement reports comprise beam link quality indicators for the serving downlink beams in the serving cell and one or more non-serving downlink beams in the serving cell. The UE further adapts the CSI configuration used for sending measurement reports depending on a beam link quality of the serving downlink beams in the serving cell.

Other embodiments of the disclosure comprise a UE configured to perform the method described in the preceding paragraph. In one embodiment, the UE comprises an interface circuit configured for communication with one or more serving cells the wireless communication network, and a processing circuit. The processing circuit is configured to receive downlink transmissions from the serving cell on one or more serving downlink beams of the serving cell, send measurement reports according to a UE-specific CSI configuration for the serving cell, said measurement reports comprising beam link quality indicators for the serving downlink beams in the serving cell and one or more non-serving downlink beams in the serving cell, and adapt the CSI configuration used for sending measurement reports depending on a beam link quality of one or more of the serving downlink beams in the serving cell.

Other embodiments of the disclosure comprise methods performed by a base station of configuring CSI reporting by a UE. The base station receives measurement reports according to a UE-specific CSI configuration for a serving cell. The measurement reports comprising beam link quality indicators for one or more serving downlink beams in the serving cell and one or more non-serving downlink beams in the serving cell. Depending on a beam link quality of the serving downlink beams, the base station signals the user equipment to adapt the UE-specific CSI configuration for the measurement reports.

Other embodiments of the disclosure comprise a base station configured to perform the method described in the preceding paragraph. In one embodiment, the base station comprises an interface circuit configured for communication with one or more serving cells the wireless communication network, and a processing circuit. The processing circuit is configured to receive measurement reports according to a UE-specific CSI configuration for a serving cell, said measurement reports comprising beam link quality indicators for one or more serving downlink beams in the serving cell and one or more non-serving downlink beams in the serving cell, and signal the user equipment to adapt the UE-specific CSI configuration for the measurement reports depending on a beam link quality of one or more of the serving downlink beams.

DETAILED DESCRIPTION

Figure 1:
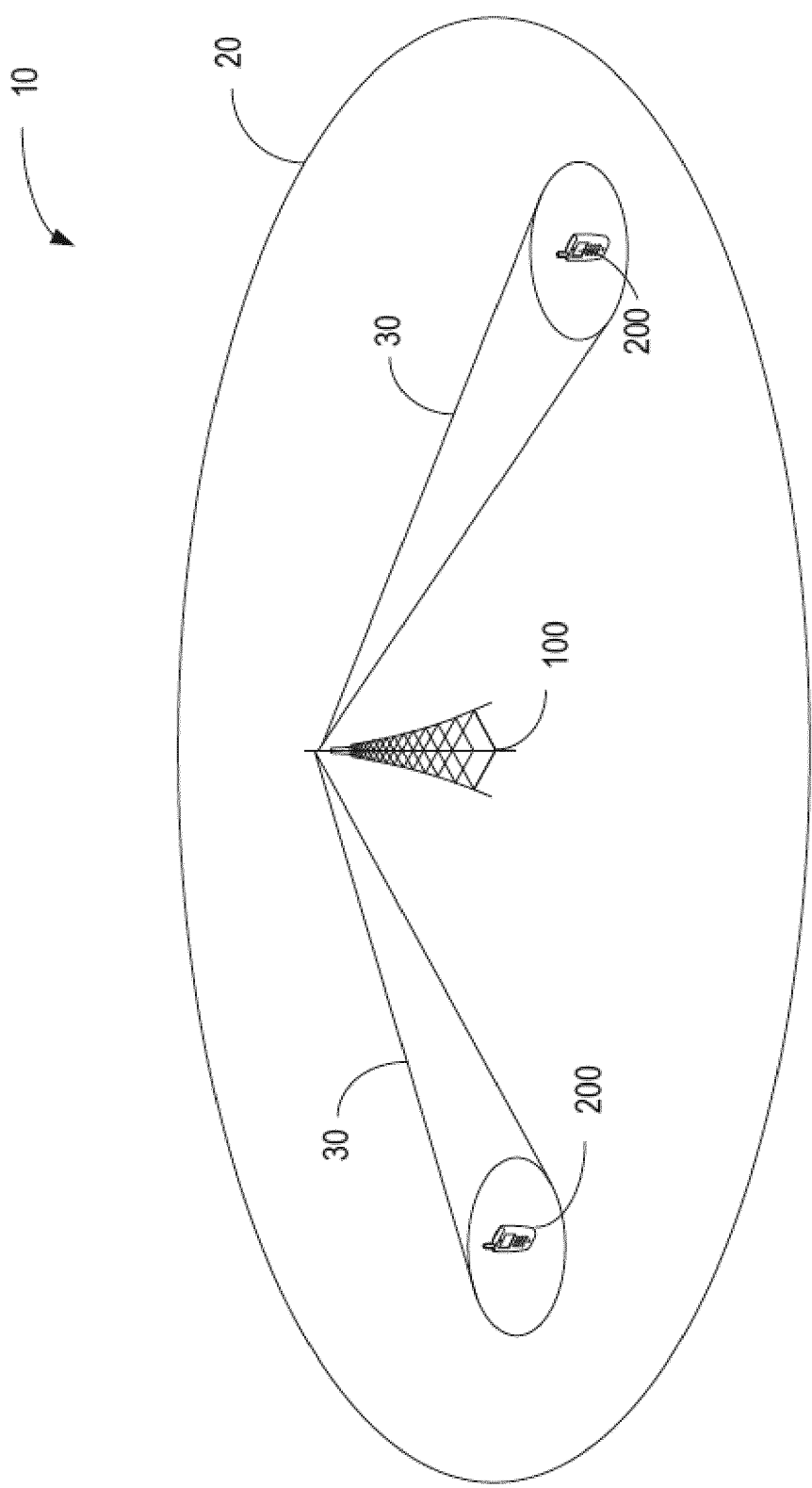
FIG. 1 illustrates an exemplary communication network according to an embodiment.

Referring now to the drawings, an exemplary embodiment of the disclosure will be described in the context of a 5G or NR wireless communication network. Those skilled in the art will appreciate that the methods and apparatus herein described are not limited to use in 5G or NR networks, but may also be used in wireless communication networks 10 where multiple beams within a single cell are used for communication with wireless devices in the cell.

FIG. 1 illustrates a wireless communication network 10 according to the NR standard currently being developed by Third Generation Partnership Project (3GPP). The wireless communication network 10 comprises one or more base stations 100 providing service to user equipment (UEs) 200 in respective cells 20 of the wireless communication network 10. The base stations 100 are also referred to as Evolved NodesBs (eNBs) and gNodeBs (gNBs) in 3GPP standards. Although only one cell 20 and one base station 100 are shown in FIG. 1, those skilled in the art will appreciate that a typical wireless communication network 10 comprises many cells 20 served by many base stations 100. One feature of NR networks is the ability of the base stations 100 to transmit and/or receive on multiple beams 30 in the same cell 20. FIG. 1 illustrates two beams 30, although the number of beams 30 in a cell 20 may be different.

The UEs 200 may comprise any type of equipment capable of communicating with the base station 100 over a wireless communication channel. For example, the UEs 200 may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

The wireless communication network 10 employs multiple beam transmission and reception on both the downlink and uplink. Similar to carrier aggregation in Long Term Evolution (LTE) systems, a UE 200 may be configured with more than one serving cell, including one PCell and multiple SCells in both the uplink and downlink. In Release 13 (Rel-13) of the NR standard, the maximum number of simultaneous carriers that can be configured for a UE 200 at any one time is 32. UCI is typically transmitted by the UE 200 on a Physical Uplink Control Channel (PUCCH) associated with the PCell.

The UE 200 can receive downlink transmissions on multiple downlink beams in any serving cell (e.g., PCells or SCells). The UE 200 monitors the beam quality of each serving downlink beam and sends channel state information (CSI) reports, also referred to herein as measurement reports, to the base station 100. The CSI reports may include beam link quality indicators for each serving downlink beam currently in use and one or more non-serving downlink beams. When the beam quality of a serving downlink beam deteriorates, the base station 100 can instruct the UE 200 to switch to one of the non-serving downlink beams for which measurement reports have been provided. A beam failure is declared when the beam link quality for a serving downlink beam falls below a threshold. In the event of a beam failure, the UE performs a contention-free random access on the PUCCH to re-establish the link with the base station.

With the increasing number of serving cells in Release 13, the PCell may become overloaded with PUCCH transmissions. The increase in the number of supported carriers requires a corresponding increase in the PUCCH payload size per UE 200 to send the CSI measurements. The increase in payload size for a UE 200 supporting carrier aggregation can severely impact the uplink load in the PCell as the number of CA-capable UEs 200 increases. Accommodating the PUCCH transmissions in the PCell will impact performance, especially for non-CA UEs 200. Therefore, it is beneficial to offload some of the PUCCH transmissions from the PCell to a SCell.

In order to offload the PUCCH transmissions from the PCell to a SCell, the cells can be divided into PUCCH cell groups. The PCell and one or more SCells are assigned to a first group, while the remaining SCells may be assigned to a separate PUCCH cell group. In the PUCCH cell groups without a PCell, a SCell can be configured with a PUCCH. This SCell is referred to herein as the PUCCH-SCell. In this manner, the transmission of UCI can be divided among the PCell, and one or more PUCCH SCells in different PUCCH cell groups.

Currently, a UE 200 can be configured with one PUCCH-SCell, meaning that the UE 200 can support two PUCCH cell groups. The two PUCCH cell groups are mutually exclusive and cross-carrier scheduling between subgroups is not allowed. In the future, more than two PUCCH cell groups may be supported.

Once a UE 200 has established a connection with the base station 100, the UE 200 performs both radio link monitoring (RLM) and beam link monitoring (BLM). The RLM procedure enables a UE 200 to detect a radio link failure (RLF) and perform a radio connection re-establishment procedure to re-establish the radio link when a RLF is detected. The RLF can be detected based on radio link measurements and/or other predetermined triggering events. For example, the UE 200 may monitor the block error rate (BLER) on the PDCCH and declare a RLF when the BLER falls below a threshold. When the UE 200 is in Radio Link Control (RLC) Acknowledgement Mode (AM), a RLF may be declared if the number of RLC retransmissions exceeds a pre-determined number. As another example, a RLF may be declared responsive to a random access (RA) failure during a handover. The base station 200 may determine a RLF based on the uplink radio channel quality.

When a RLF is determined by the UE 200, the UE releases its configured radio resources and initiates a radio connection re-establishment procedure. The radio resources released by the UE 200 include resources such as a PUCCH, semi-static uplink grants and/or downlink assignments, and reference signals. For radio connection re-establishment, the UE 200 first selects a target cell and performs a random access procedure to connect to the target cell. The Cell Radio Network Temporary Identifier (C-RNTI) is reported in message 3 of the random access procedure via a MAC control element (CE) so that the target cell can identify the UE 200 and fetch the UE context. After the random access procedure is complete, the new radio resources are configured for the UE 200.

As noted above, the UE 200 also monitors the beam link quality of the serving downlink beams and triggers a beam link failure (BLF) when the beam link quality falls below a pre-configured signal quality threshold for a pre-determined period of time, or when some other triggering condition is met. The BLF may also be based on signal quality measurements, such as the BLER of the PDCCH or the signal quality of received reference signals. In contrast to a RLF, the UE does not release configured radio resources when a BLF is declared. Instead, a beam failure recovery procedure is triggered and communications resume using the already configured resources once the UE recovers from the beam link failure.

In exemplary embodiments, contention-free random access (CFRA) is used for beam failure recovery. A dedicated Physical Random Access Channel (PRACH) resource is assigned to the UE. The PRACH resource may comprise a UE-specific preamble and/or a UE-specific time frequency resource for PRACH transmissions. After a BLF is declared, the UE 200 transmits a preamble to the serving cell using the dedicated PRACH resources. Upon reception of the preamble, the base station 100 knows which UE 200 is requesting beam failure recovery based on the PRACH information. The base station 200 can respond to the UE 200 using a PDCCH transmission addressed to the C-RNTI associated with the UE 200. The UE 200 can then continue communications using the original radio resource configuration, which minimizes service interruption.

During the beam failure recovery procedure, new beams are selected for transmission and reception. The base station 100 transmits a synchronization signal block (SSB) in different wide beams. The UE 200 measures the signal quality of the SSBs received in the different wide beams and selects the downlink beam with the best signal quality. The selected downlink beam is a part of a beam pair. The base station 100 and UE 200 then perform the random access procedure on the selected beam pair. The UE 200 transmits the random access preamble in the corresponding uplink beam of the selected beam pair. After completion of the random access procedure, the base station 100 and UE 200 have established a course beam for transmission and reception respectively.

The UE 200 receives the channel state information reference signal (CSI-RS) configuration for the cell during the random access procedure. After the course beams for transmission and reception are established, the base station 100 schedules transmissions of CSI-RSs to the UE 200 for a selected set of narrow beams. The UE 200 measures the signal quality of the CSI-RSs and returns a measurement report to the base station 200 to report the CSI or Reference Signal Received Power (RSRP) using the PUCCH or Physical Uplink Shared Channel (PUSCH). Based on the measurement report, the base station 100 refines the downlink beam. Once the downlink beam is selected, the base station 100 repeatedly transmits the CSI-RSs on the transmit beam to the UE 200 while the UE switches between a set of narrow receive beams and measures the CSI or RSRP of the CSI-RSs on the different receive beams. The UE returns the measurement report to the base station 100 over the PUCCH or PUSCH.

For the beam failure recovery procedure, dedicated PRACH resources are assigned to the UE 200 so that the UE 200 can perform a contention-free random access in the PCell. In the case that there are no dedicated PRACH resources configured for the UE 200, the UE 200 performs a contention-based random access. Due to limitations in the MAC, there is currently no beam failure recovery procedure for a SCell. This means that the UE 200 would either need to perform the beam failure recovery procedure in the PCell, or rely on existing procedures to recover from the BLF. It is inefficient to perform a random access on the PCell to recover from a BLF on the SCell. Relying on random access-based recovery procedures in the PCell could overload the PCell where there are a large number of CA-capable UEs 200. In the event of a beam failure in the SCell, the UE 200 could continue to send CSI reports to the PCell or PUCCH-SCell. In this case, the base station 100 may determine, based on the CSI reports, that the UE 200 is in a BLF and order the UE 200 to switch beams. However, the PUCCH CSI report may be infrequently triggered, meaning that the UE 200 may take a long time to recover from a beam failure, which would negatively affect the QoS.

One aspect of the present disclosure comprises techniques to reduce the number of BLFs in SCells as well as the latency in recovering from a BLF in a SCell. Generally, the CSI configuration controlling measurement reporting is adapted depending on the beam link quality of one or more serving downlink beams in the SCell. The UE 200 may have a UE-specific CSI configuration for each serving cell. The beam link quality of the serving downlink beams in the SCell may be determined, for example, based on the RSRP of the CSI-RS, or other signal quality measurements. Typically, there is a single serving downlink beam in the SCell, although more could be used. Measurement reporting can be adapted in a number of ways. For example, the UE 200 may adapt the reporting frequency at which measurement reports are sent. The UE 200 could also adapt a reporting frequency at which individual beam link quality indicators for one or more downlink beams are sent without altering the reporting frequency of the measurement report. In this case, the measurement reports may include more or less measurements depending on the reporting frequency assigned to individual downlink beams. In other embodiments, the UE 200 can vary a number of non-serving downlink beams for which measurements are sent. These techniques may be used separately or in combination.

In some embodiments, the UE 200 may be provided with multiple CSI configurations for each SCell, each of which is associated with a specific range of quality measurements. Thus, the UE 200 can apply different CSI configurations adapted to the signal quality measurements of the serving downlink beams in the SCell. In one example, when the beam link quality of the serving downlink beam in a SCell deteriorates, the UE 200 can provide more frequent CSI reports for the serving cell via the PUCCH or PUSCH in the PCell or PUCCH-SCell, depending on which PUCCH cell group the SCell belongs to. Similarly, when the beam link quality of the serving downlink beam in a SCell improves, the UE can provide CSI report less frequently for the corresponding SCell. By adapting the CSI configurations for a SCell responsive to signal quality of the serving downlink beams in the SCell, the number of beam link failures is reduced. Further, adaptation of the measurement reporting can result in less time needed to recover from a beam link failure.

In one exemplary embodiment, the network provides multiple CSI configurations for a SCell. Among those configurations, each configuration may be associated with specific quality range of serving beam measurement. In this manner, the UE 200 can apply different CSI settings adaptive to the beam link quality of the serving downlink beam. In one example, when the beam link quality of the serving downlink beam in a SCell deteriorates, the UE 200 can provide more frequent CSI reports for the SCell via the PUCCH or PUSCH in the PCell or PUCCH-SCell, depending on which PUCCH cell group the SCell belongs to. Similarly, when the beam link quality of the serving downlink beam in a SCell improves, the UE can send the CSI report for the corresponding SCell less often.

Figure 2:
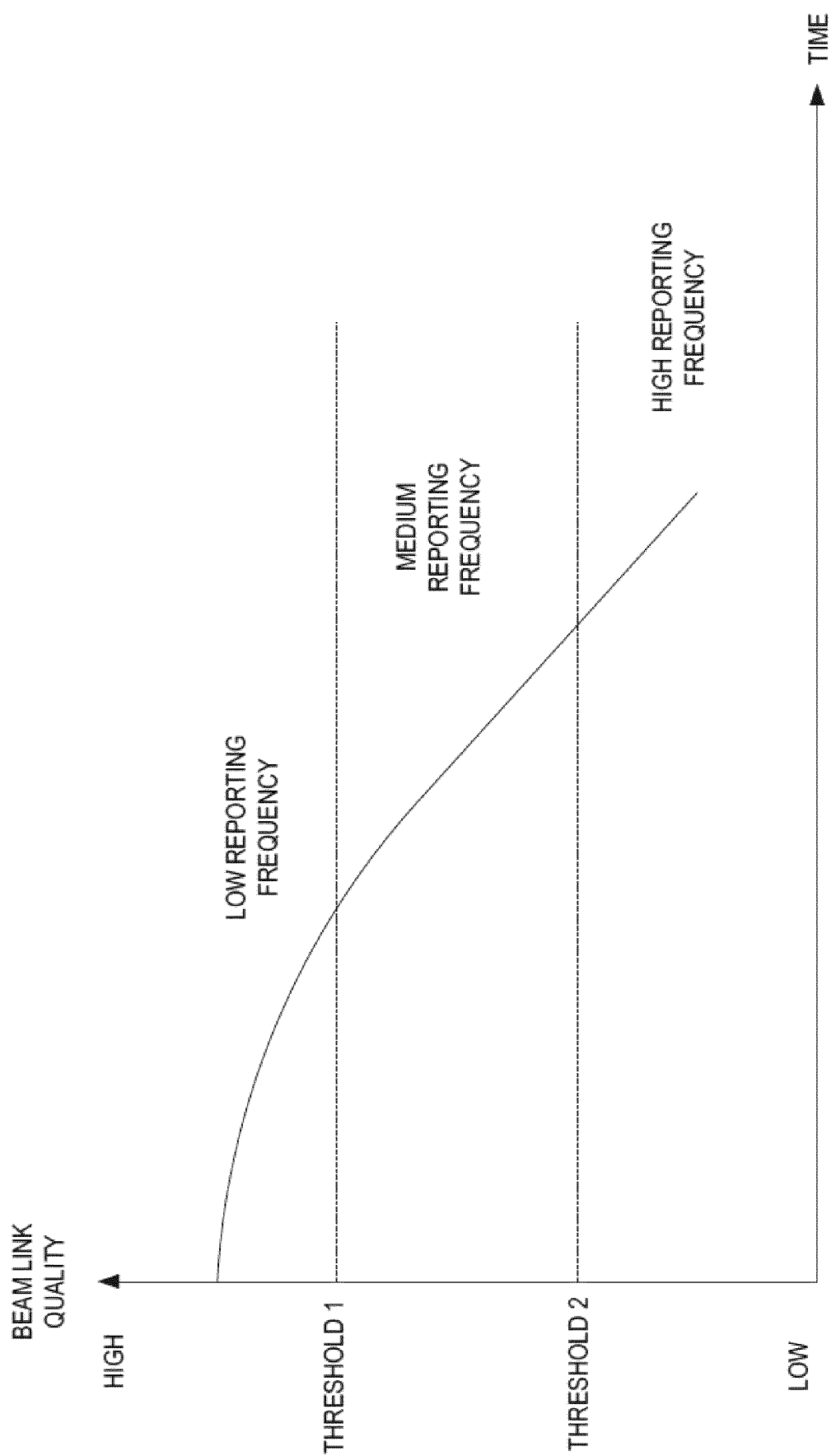
FIG. 2 illustrates signal quality ranges for adapting a CSI configuration used by a UE for measurement reporting.

This approach is illustrated in FIG. 2. As shown in FIG. 2, the UE 200 is configured with two signal quality thresholds, denoted Threshold 1 and Threshold 2. The thresholds define three different signal quality ranges where different CSI configurations are applied In this example, each CSI configuration includes different reporting intervals or reporting frequencies referred to as the low frequency, medium frequency, and high frequency. When the signal quality for a serving downlink beam in a SCell is above Threshold 1, the UE 200 transmits the CSI reports using a low reporting frequency, i.e. less often. When the signal quality for a serving downlink beam is between Threshold 1 and Threshold 2, the UE 200 transmits the CSI reports with the medium reporting frequency. Finally, when the signal quality for a serving downlink beam is below Threshold 2, the UE 200 transmits the CSI reports with the high reporting frequency. In this example, a signal quality below Threshold 2 may be indicative of a BLF. The CSI reports, also referred to as measurement reports, are sent on the PUCCH associated with the PCell in the same PUCCH cell group, or in the PUCCH-SCell in the same PUCCH cell group. Increasing the frequency of the CSI reports reduces the likelihood of a BLF and, in the event that a BLF occurs, reduces the time to recover from the BLF.

Although FIG. 2 illustrates two different signal quality thresholds, some embodiments may use a single signal quality threshold and other embodiments may use more than two signal quality thresholds.

In one embodiment, upon detection of a BLF in a SCell, or when the beam link quality of serving downlink beam of this SCell meets a predetermined criteria, the UE 200 can provide more frequent CSI reports via PUCCH or PUSCH. The report is transmitted on the PCell or PUCCH-SCell, depending on which PUCCH cell group to which this SCell belongs. The predefined criteria could be defined as the beam link quality of the serving downlink beam falling below a given threshold for a given time period. When the beam failure or the detected event ends, the UE 200 may recover on the same beam or switch to another beam. After recovering, the UE 200 returns to normal so that the UE 200 may provide CSI reports less often.

In some embodiments, when the UE 200 changes the reporting frequency for CSI reports in a SCell, the UE 200 may also change the CSI reporting frequency for CSI reports in other SCells belonging to the same PUCCH cell group. In one example, when the UE 200 increases the reporting frequency for a SCell that detects a beam failure or the degradation of beam quality in the serving downlink beam, in order to maintain the PUCCH load unchanged, the UE 200 may decrease the reporting frequency for CSI reports in other SCells belonging to the same PUCCH cell group.

In some embodiments, upon reception of the CSI report for a SCell from a UE 200, the base station 100 may order the UE 200 to change its reporting frequency or CSI configuration via MAC CE, downlink control information (DCI) or radio resource control (RRC) signaling. In case the UE 200 is preconfigured with multiple CSI configurations that have different CSI reporting frequencies, the base station 100 orders the UE 200 to switch from one configuration to another configuration.

In some embodiments, the CSI reports include measurements for one or more non-serving downlink beams. The number of the non-serving beams for a SCell included in the CSI report may be also adapted according to the beam link quality on the current serving downlink beam. When the beam link quality of the serving downlink beam deteriorates, the network configures the UE 200 to measure more non-serving downlink beams for CSI reporting. Conversely, when the beam link quality of the serving downlink beam improves, the network configures the UE to measure fewer non-serving beams for CSI reporting.

In some embodiments, the UCI carrying the CSI report for the SCell that has detected a beam failure is prioritized over UCI for other SCells in the same PUCCH cell group. With prioritization, the CSI report for the SCell experiencing poor quality would be transmitted first if there are not enough PUCCH resources in the PUCCH cell group for all UCI.

Figure 3:
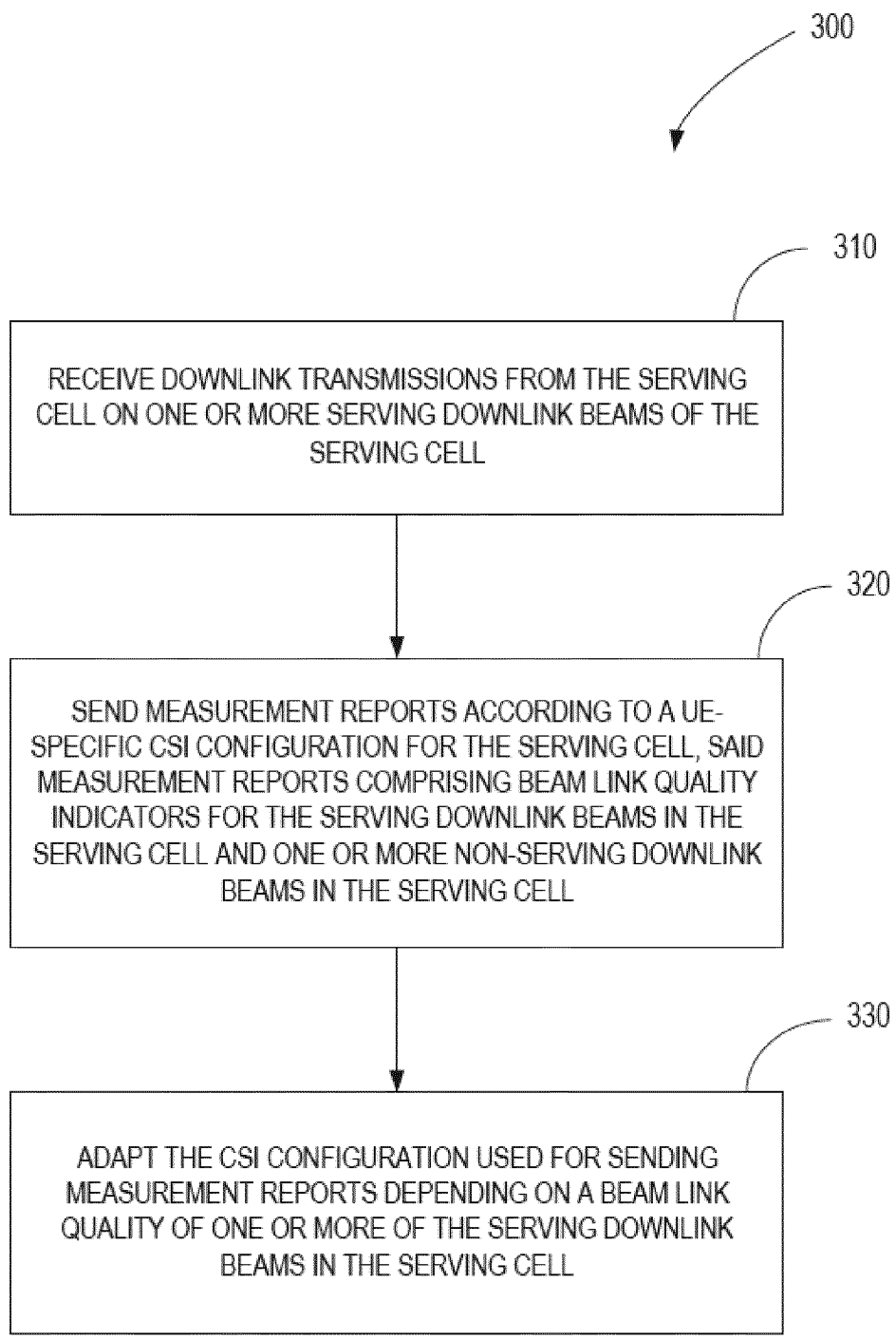
FIG. 3 illustrates a method implemented by UE for reporting beam link quality measurements.

FIG. 3 illustrates an exemplary method 300 performed by a UE 200 according to an embodiment. The UE 200 receives downlink transmissions from the serving cell on one or more serving downlink beams of the serving cell (block 310). The UE 200 sends measurement reports (e.g., CSI reports) according to a UE-specific CSI configuration for the serving cell (block 320). The measurement reports comprise beam link quality indicators for the serving downlink beams in the serving cell and one or more non-serving downlink beams in the serving cell. The UE 200 adapts the CSI configuration used for sending measurement reports depending on a beam link quality of one or more of the serving downlink beams in the serving cell (block 330). For example, the UE 200 may adapt the CSI configuration depending on the beam link quality of the strongest serving downlink beam, or based on an average beam link quality of two or more serving downlink beams.

In some embodiments of the method 300, adapting the CSI configuration used for sending the measurement reports comprises adapting a reporting frequency of the measurement reports for the serving cell depending on the beam link quality of the serving downlink beams of the serving cell.

In some embodiments of the method 300, adapting a reporting frequency of the measurement reports for the serving cell comprises increasing the reporting frequency of the measurement reports for the serving cell responsive to a deterioration in the beam link quality of the serving downlink beams.

In some embodiments of the method 300, adapting a reporting frequency of the measurement reports for the serving cell comprises decreasing the reporting frequency of the measurement reports for the serving cell responsive to an improvement in the beam link quality of the serving downlink beams.

Some embodiments of the method 300 further comprise, responsive to increasing the reporting frequency of the measurement reports in the serving cell, decreasing a reporting frequency of measurement reports for another serving cell to at least partially offset the increase in load due to the increase in the reporting frequency for the serving cell.

Some embodiments of the method 300 further comprise, responsive to decreasing the reporting frequency of the measurement reports in the serving cell, increasing a reporting frequency of the measurement reports in the another serving cell.

In some embodiments of the method 300, adapting the CSI configuration used for sending measurement reports comprises comparing the beam link quality indicator for at least one serving downlink beam to a threshold, and changing the reporting frequency of the measurement reports based on the comparison.

In some embodiments of the method 300, changing the reporting frequency of the measurement reports comprises sending the measurement reports at a first reporting frequency when the beam link quality indicator is greater than the threshold, and sending the measurement reports at a second reporting frequency greater than the first reporting frequency when the beam link quality indicator is lower than the threshold.

In some embodiments of the method 300, adapting the CSI configuration used for sending measurement reports comprises varying the number of non-serving downlink beams of the serving cell for which measurements are reported depending on the beam link quality indicators for the serving downlink beams of the serving cell.

In some embodiments of the method 300, varying the number of non-serving downlink beams of the serving cell for which measurements are reported comprises increasing the number of non-serving downlink beams for which measurements are reported responsive to a deterioration in the beam link quality of the serving downlink beams.

In some embodiments of the method 300, varying the number of non-serving downlink beams of the serving cell for which measurements are reported comprises decreasing the number of candidate downlink beams for which measurements are reported responsive to an improvement in the beam link quality of the serving downlink beams.

In some embodiments of the method 300, adapting the CSI configuration used for sending measurement reports comprises storing two or more CSI configurations in memory, and selecting an active CSI configuration from the CSI configurations stored in memory depending on the beam link quality for the serving downlink beams in the serving cell.

In some embodiments of the method 300, adapting the CSI configuration used for sending measurement reports comprises receiving, responsive to a change in the bean link quality of the serving downlink beams, control information from the serving cell or another cell instructing the user equipment to change CSI configuration, and changing the CSI configuration responsive to receipt of the control information from the serving cell or another cell.

Some embodiments of the method 300 further comprise, responsive to the detection of a beam link failure of a serving downlink beam, prioritizing the transmission of the beam link quality indicators for the serving downlink beam for which the failure was detected over beam link quality indicating for other downlink beams in the same cell group.

In some embodiments of the method 300, the serving cell comprises a secondary serving cell, and sending measurement reports comprises sending measurement reports on an uplink control channel in a primary serving cell.

In some embodiments of the method 300, the serving cell comprises a secondary serving cell, and sending measurement reports comprises sending measurement reports on an uplink control channel in the secondary serving cell.

Figure 4:
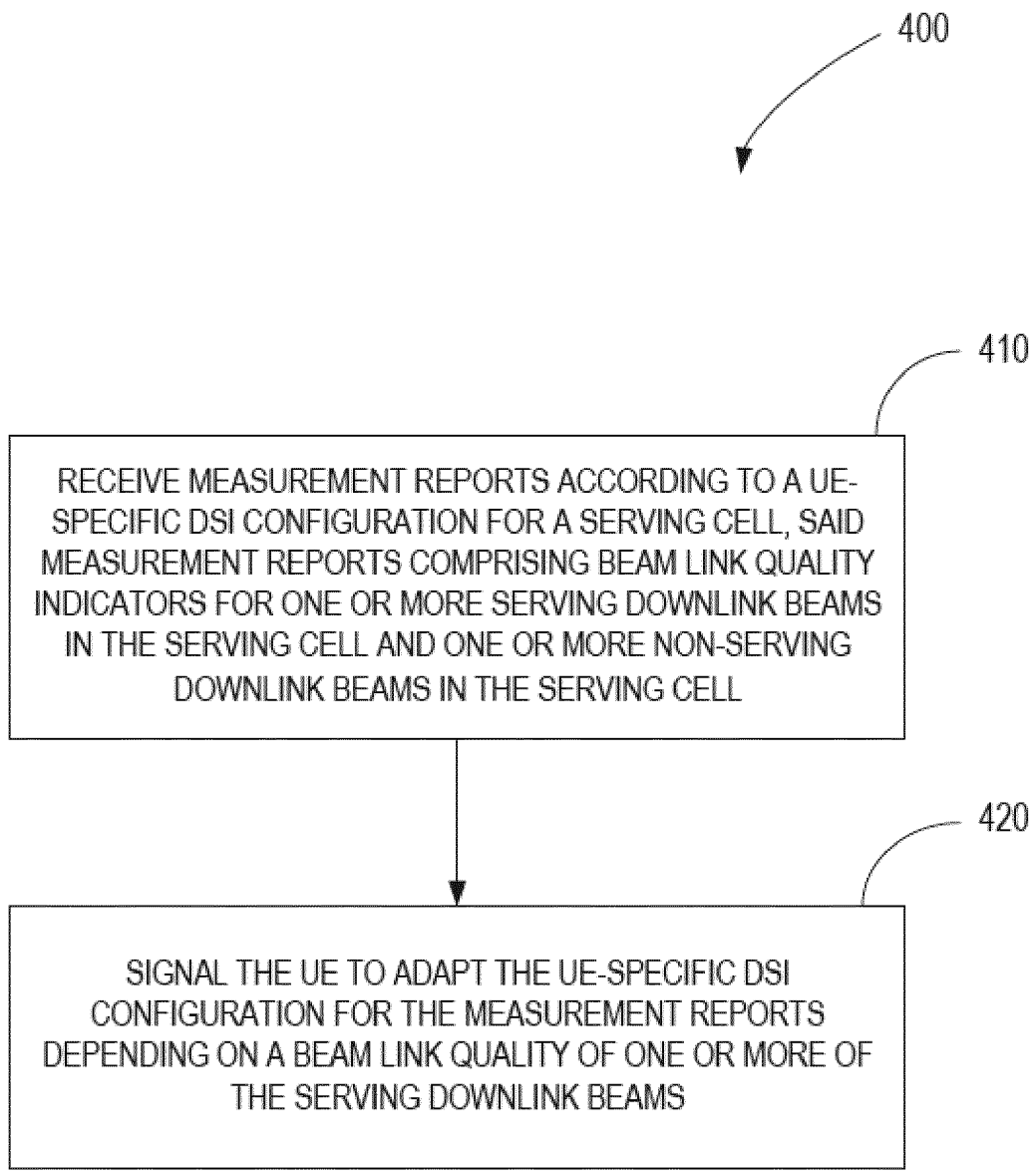
FIG. 4 illustrates a method implemented by a base station of configuring measurement reporting for a UE.

FIG. 4 illustrates an exemplary method 400 performed by a base station 100 of configuring channel state information (CSI) reporting by a UE 200. The base station 100 receives measurement reports according to a UE-specific CSI configuration for a serving cell (block 410). The measurement reports include beam link quality indicators for one or more serving downlink beams in the serving cell and one or more non-serving downlink beams in the serving cell. Depending on a beam link quality of one or more of the serving downlink beams, the base station 200 signals the user equipment to change the CSI configuration for the measurement reports (block 420). For example, the base station 100 may signal the UE 200 to adapt the CSI configuration depending on the beam link quality of the strongest serving downlink beam, or based on an average beam link quality of two or more serving downlink beams.

In some embodiments of the method 400, signaling the UE 200 to adapt the UE-specific CSI configuration for the measurement reports comprises signaling the UE 200 to change a reporting frequency of the measurement reports depending on the beam link quality of the serving downlink beams of the serving cell.

In some embodiments of the method 400, signaling the UE 200 to change a reporting frequency of the measurement reports comprises signaling the UE 200 to increase the reporting frequency of the measurement reports responsive to a deterioration in the beam link quality of the serving downlink beams.

In some embodiments of the method 400, signaling the UE 200 to change a reporting frequency of the measurement reports comprises decreasing the reporting frequency of the measurement reports responsive to an improvement in the beam link quality of the serving downlink beams.

In some embodiments of the method 400, signaling the UE 200 to adapt the UE-specific CSI configuration for the measurement reports comprises signaling the UE 200 to vary a number of non-serving downlink beams in the serving cell for which measurements are reported depending on the beam link quality indicators for the serving downlink beams in the serving cell.

In some embodiments of the method 400, signaling the UE 200 to vary a number of non-serving downlink beams of the serving cell for which measurements are reported comprises signaling the UE 200 to increase the number of non-serving downlink beams for which measurements are reported responsive to a deterioration in the beam link quality of the serving downlink beams.

In some embodiments of the method 400, signaling the UE 200 to vary a number of non-serving downlink beams of the serving cell for which measurements are reported comprises signaling the UE 200 to decrease the number of candidate downlink beams for which measurements are reported responsive to an improvement in the beam link quality of the serving downlink beams.

In some embodiments of the method 400, signaling the UE 200 to adapt the UE-specific CSI configuration for the measurement reports comprises signaling the UE 200 to change from a first pre-defined CSI configuration to a second pre-defined CSI configuration.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
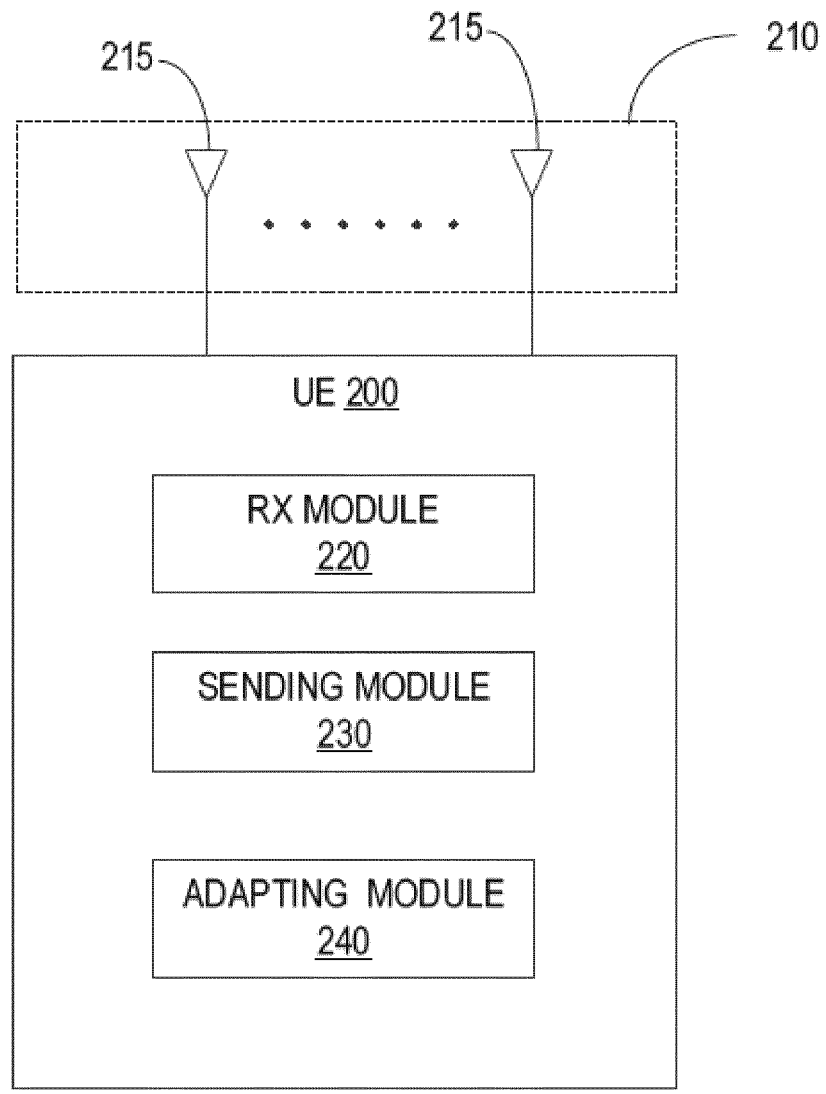
FIG. 5 is a schematic block diagram of an exemplary UE.

FIG. 5 illustrates a UE 200 in accordance with one or more embodiments. The UE 200 comprises an antenna array 210 having multiple antennas 215, a receiving (RX) module 220, a sending module 230 and an adapting module 240. The various modules 220, 230, and 240 can be implemented by hardware and/or by software code that is executed by one or more processors or processing circuits. The receiving module 220 is configured to receive downlink transmissions from a serving cell on one or more serving downlink beams of the serving cell. The sending module 230 is configured to send measurement reports according to a UE Specific CSI configuration for the serving cell. The measurement reports comprise beam link quality indicators for the serving downlink beams in the serving cell and one or more non-serving downlink beams in the serving cell. The adapting module 240 is configured to adapt the CSI configuration for sending measurement reports depending on a beam link quality of the serving downlink beams in the serving cell.

Figure 6:
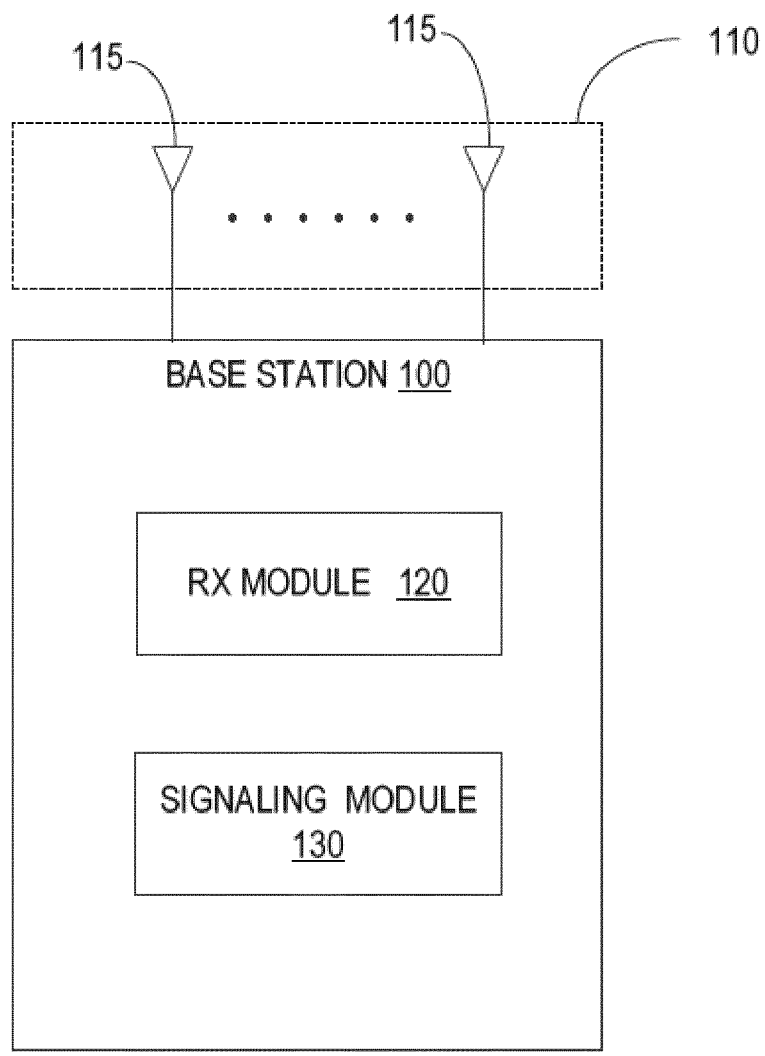
FIG. 6 is a schematic block diagram of an exemplary base station.

FIG. 6 illustrates a base station 100 in accordance with one or more embodiments. The base station 100 comprises an antenna array 110 having multiple antennas 115, a receiving (RX) module 120, and a signaling module 130. The various modules 120 and 130 can be implemented by hardware and/or by software code that is executed by a processor or processing circuit. The receiving module 120 is configured to receive measurement reports according to a UE Specific CSI configuration for a serving cell. The measurement reports include beam link quality indicators for one or more serving downlink beams in the serving cell and one or more non-serving downlink beams in the serving cell. The signaling module 130 is configured to signal the UE 200 to change the CSI configuration for the measurement reports depending on a beam link quality of the serving downlink beams.

Figure 7:
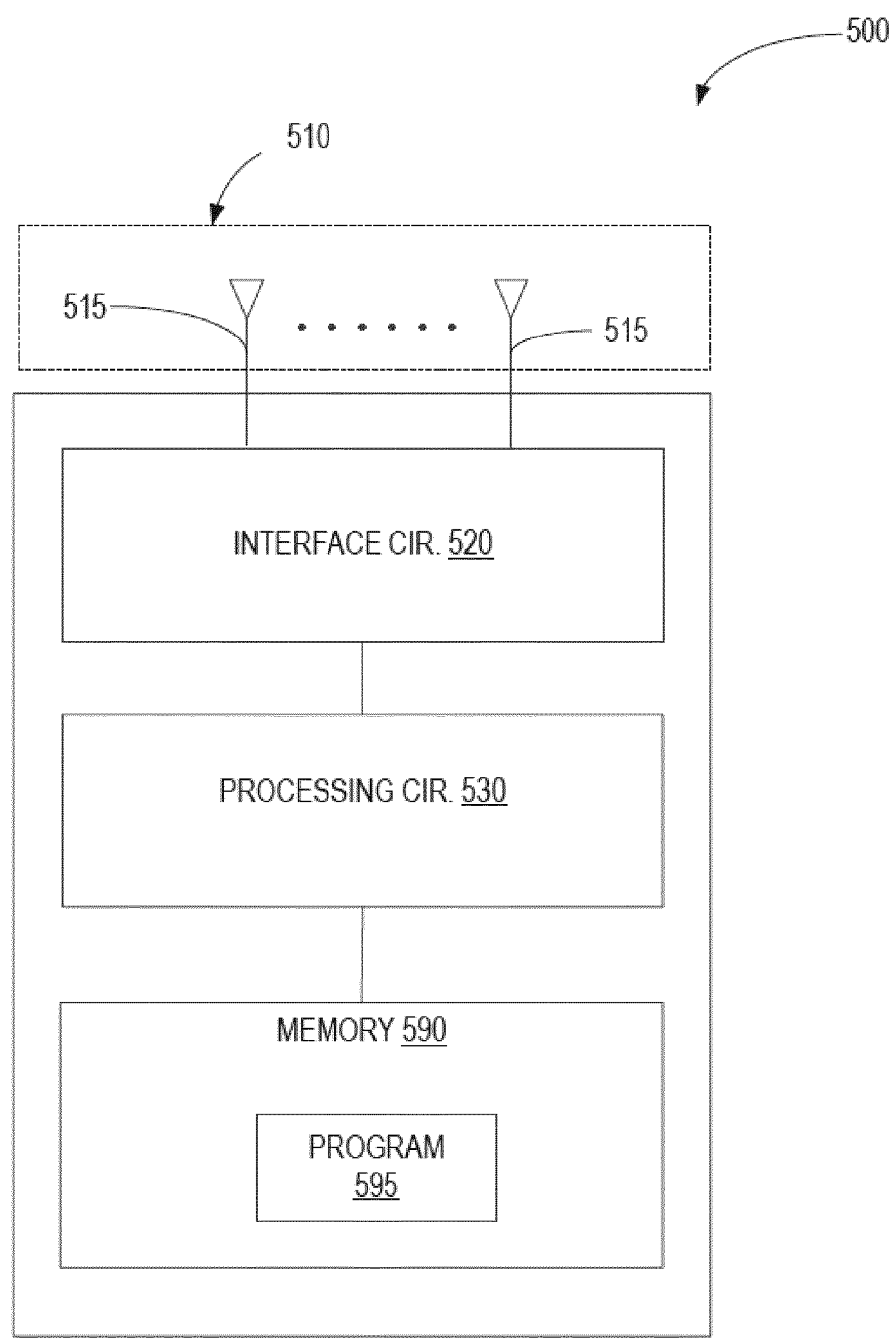
FIG. 7 is a functional block diagram of a UE according to an embodiment.

FIG. 7 illustrates a UE 500 according to one embodiment. The UE 500 comprises an antenna array 510 with multiple antenna elements 515, an interface circuit 520, a processing circuit 530, and memory 590.

The interface circuit 520 is coupled to the antennas 515 and comprises the radio frequency (RF) circuitry needed for transmitting and receiving signals over a wireless communication channel. The processing circuit 530 controls the overall operation of the UE 500 and processes the signals transmitted to or received by the radio node 500. Such processing includes coding and modulation of transmitted data signals, and the demodulation and decoding of received data signals. The processing circuit 530 may comprise one or more microprocessors, hardware, firmware, or a combination thereof.

Memory 590 comprises both volatile and non-volatile memory for storing computer program code and data needed by the processing circuit 530 for operation. Memory 590 may comprise any tangible, non-transitory computer-readable storage medium for storing data including electronic, magnetic, optical, electromagnetic, or semiconductor data storage. Memory 590 stores a computer program 595 comprising executable instructions that configure the processing circuit 530 to implement methods 300 according to FIG. 3 as described herein. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 595 for configuring the processing circuit 530 as herein described may be stored in a removable memory, such as a portable compact disc, portable digital video disc, or other removable media. The computer program 595 may also be embodied in a carrier such as an electronic signal, optical signal, radio signal, or computer readable storage medium.

Figure 8:
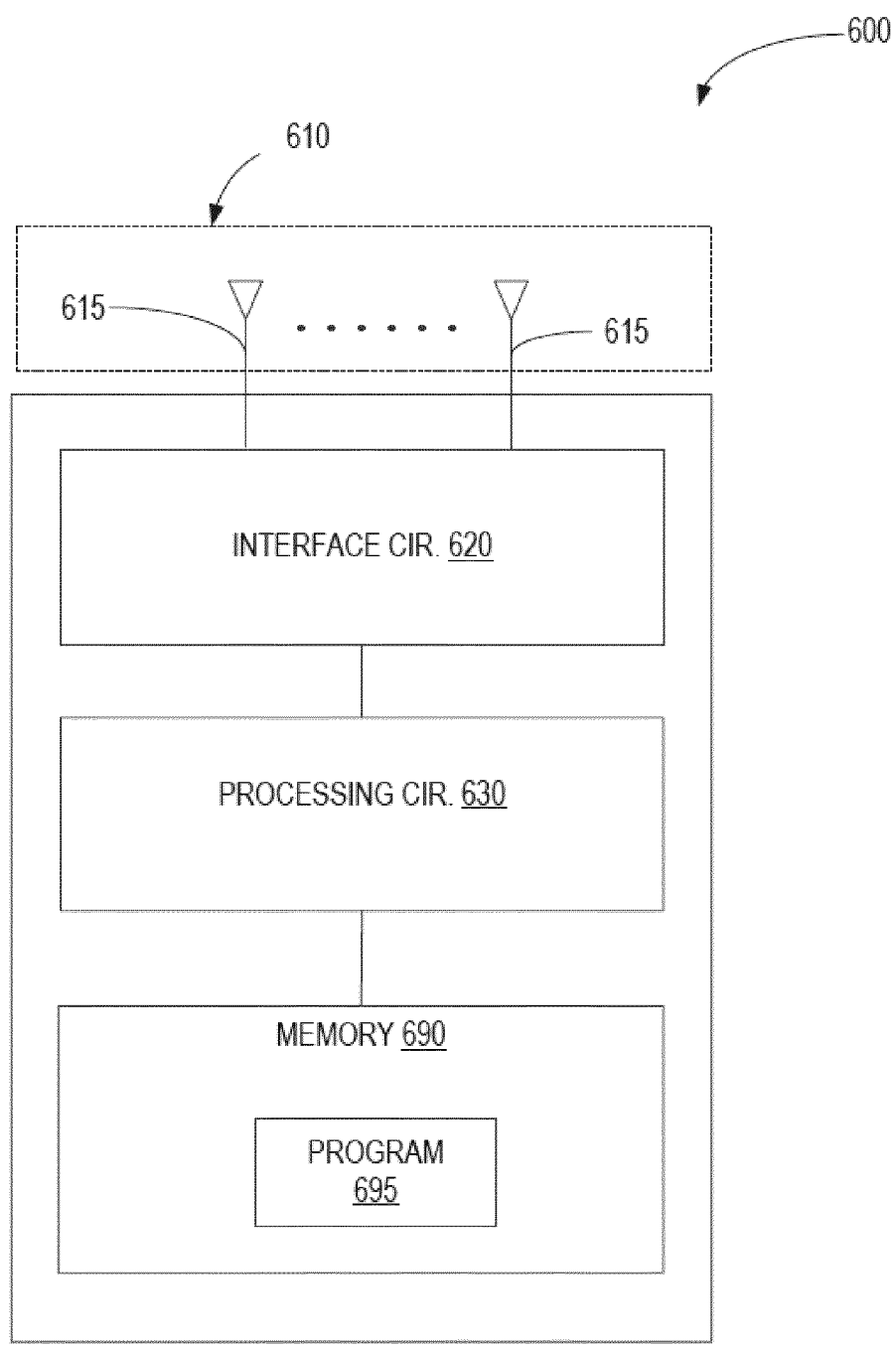
FIG. 8 is a functional block diagram of a base station according to an embodiment.

FIG. 8 illustrates a base station 600 according to one embodiment. The base station 600 comprises an antenna array 610 with multiple antenna elements 615, an interface circuit 620, a processing circuit 630, and memory 690.

The interface circuit 620 is coupled to the antennas 615 and comprises the radio frequency (RF) circuitry needed for transmitting and receiving signals over a wireless communication channel. The processing circuit 630 controls the overall operation of the radio node 600 and processes the signals transmitted to or received by the base station 600. Such processing includes coding and modulation of transmitted data signals, and the demodulation and decoding of received data signals. The processing circuit 630 may comprise one or more microprocessors, hardware, firmware, or a combination thereof.

Memory 690 comprises both volatile and non-volatile memory for storing computer program code and data needed by the processing circuit 630 for operation. Memory 690 may comprise any tangible, non-transitory computer-readable storage medium for storing data including electronic, magnetic, optical, electromagnetic, or semiconductor data storage. Memory 690 stores a computer program 695 comprising executable instructions that configure the processing circuit 630 to implement methods 400 according to FIG. 4 as described herein. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 695 for configuring the processing circuit 630 as herein described may be stored in a removable memory, such as a portable compact disc, portable digital video disc, or other removable media. The computer program 695 may also be embodied in a carrier such as an electronic signal, optical signal, radio signal, or computer readable storage medium.

Figure 9:
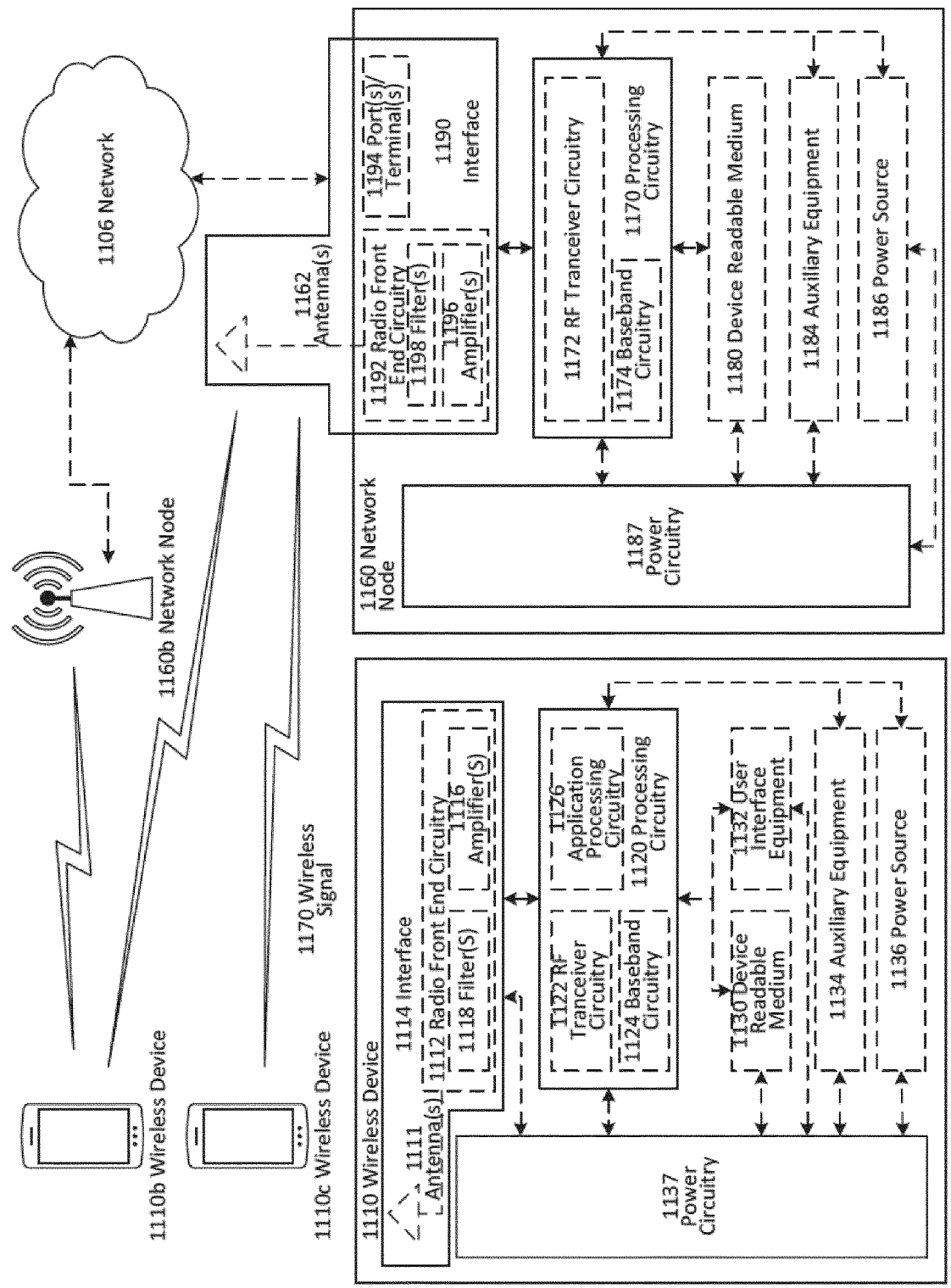
FIG. 9 illustrates an exemplary wireless network according to an embodiment.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, NodeBs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 9 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). A vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 10:
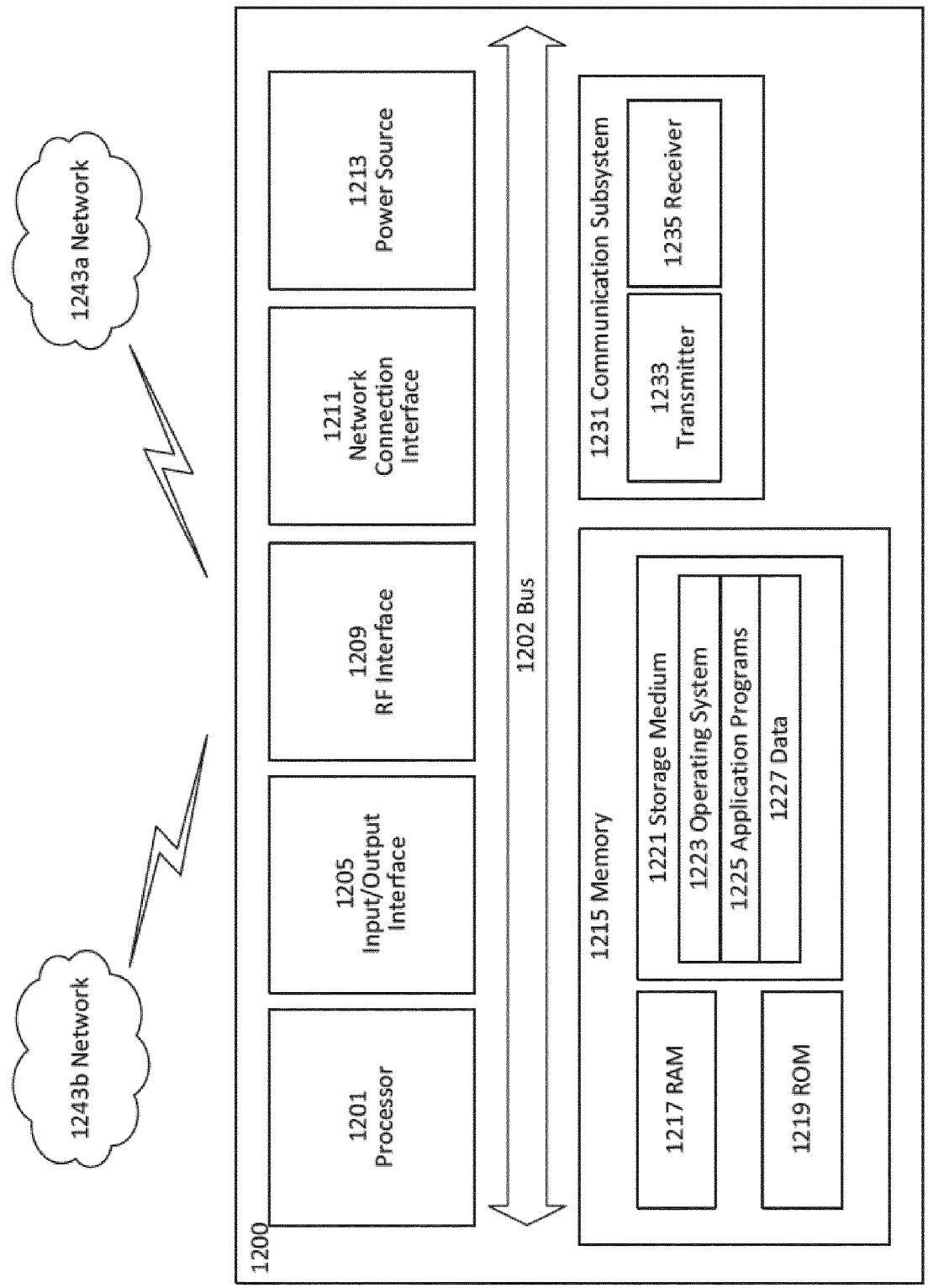
FIG. 10 illustrates an exemplary UE according to an embodiment.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeably. Accordingly, although FIG. 10 is a UE, the components discussed herein are equally applicable to a WD, and vice-versa.

In FIG. 10, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 10, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 11:
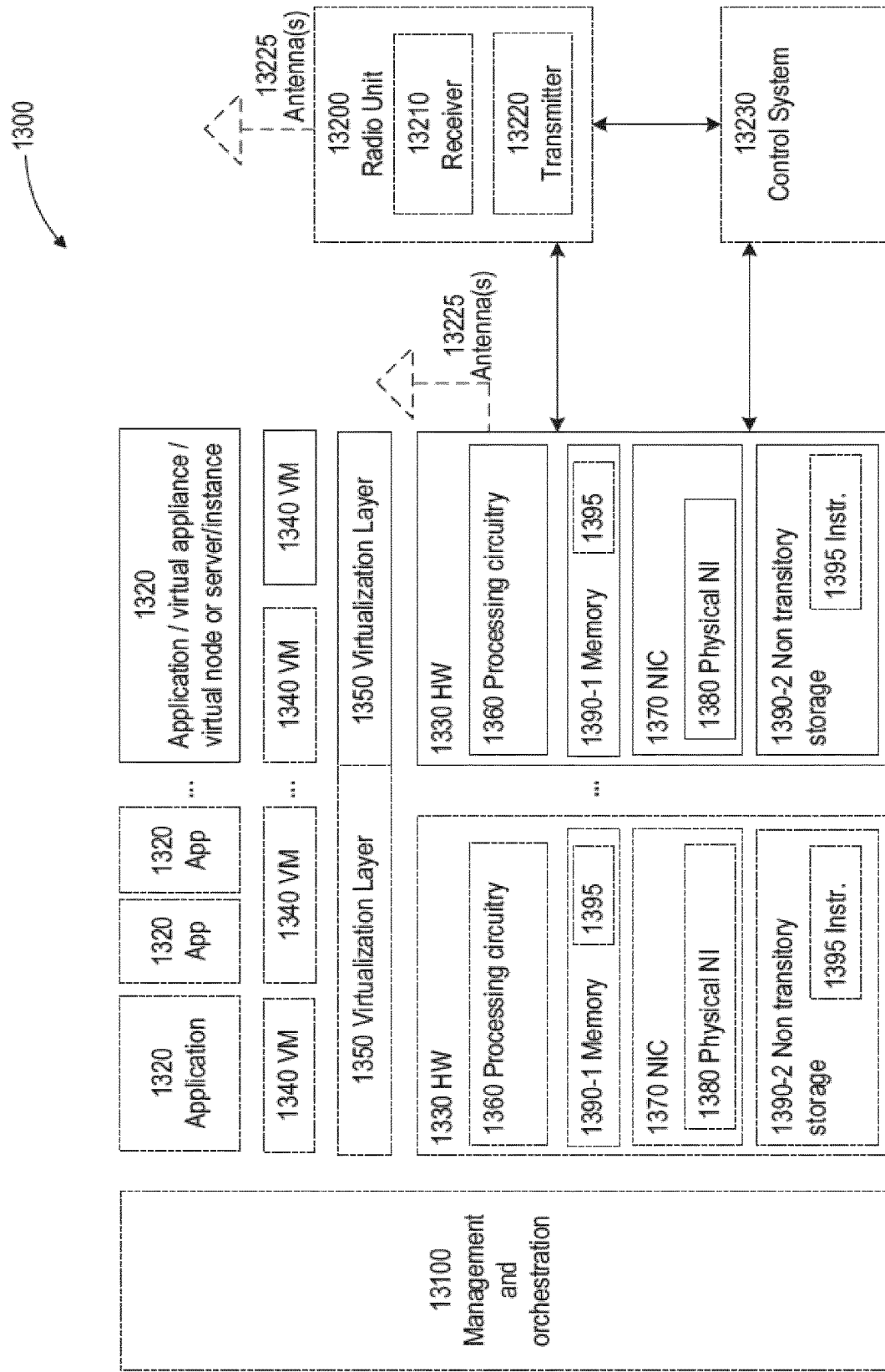
FIG. 11 illustrates an exemplary virtualization environment according to an embodiment.

FIG. 11 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 11, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 11.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 12:
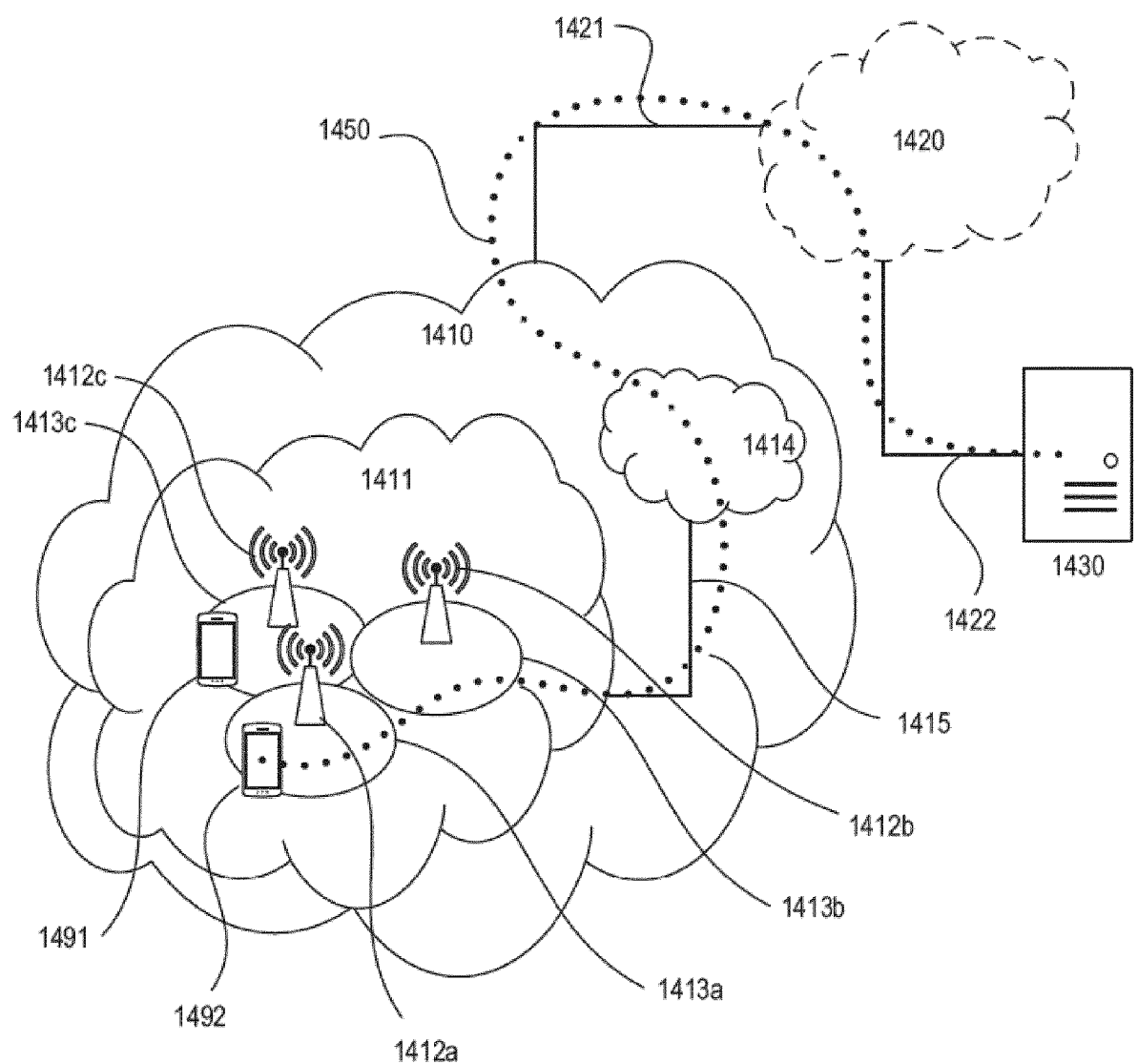
FIG. 12 illustrates an exemplary telecommunication network connected via an intermediate network to a host computer according to an embodiment.

FIG. 12 illustrates a telecommunication network connected via an intermediate network to a host computer in accordance with some embodiments. In particular, with reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 12 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 13:
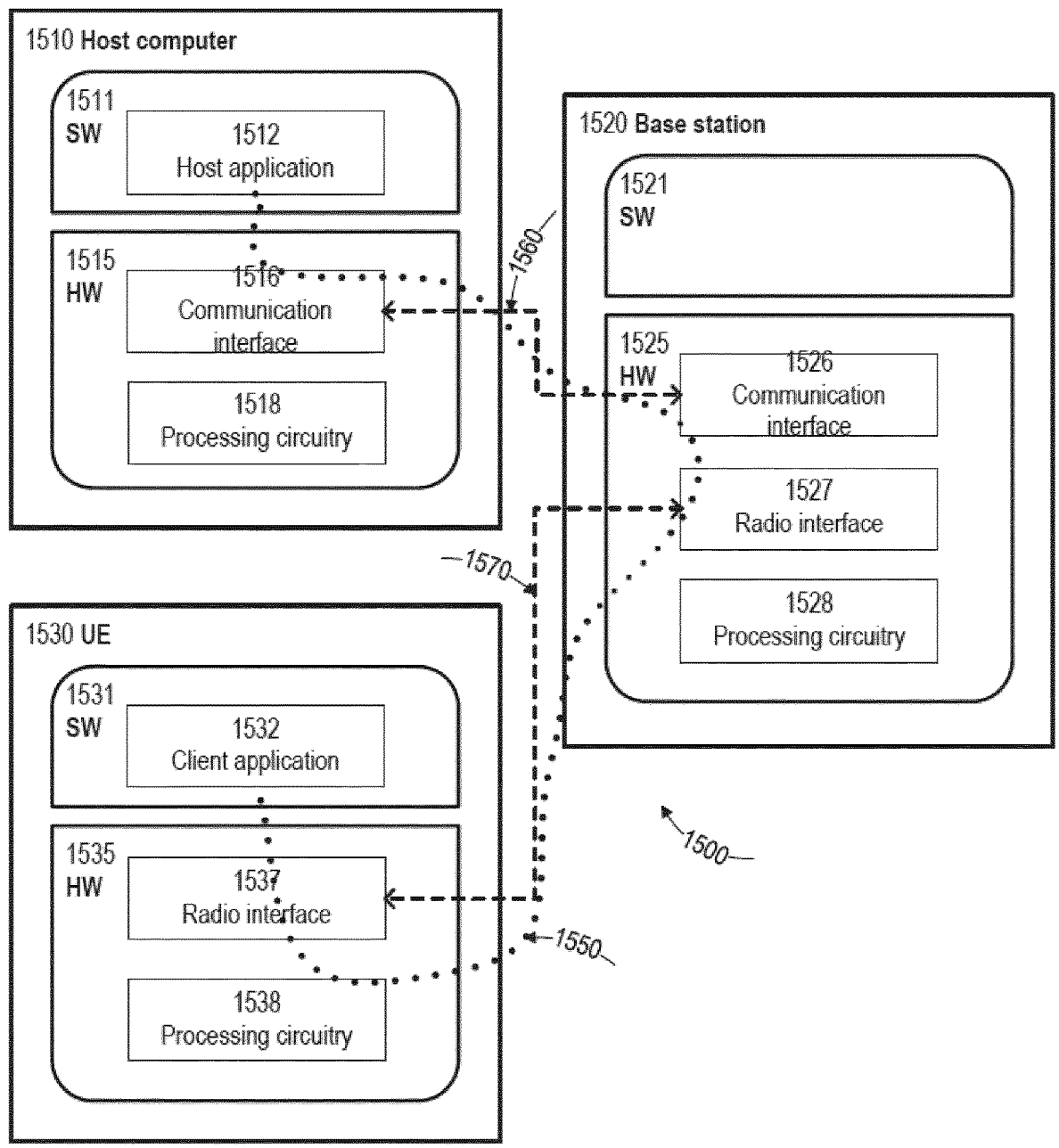
FIG. 13 illustrates an exemplary host computer communicating via a base station with a user equipment over a partially wireless connection according to an embodiment.

Example implementations, in accordance with an embodiment, of the UE, base station and host computer discussed in the preceding paragraphs will now be described with reference to FIG. 13. FIG. 13 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 13) served by base station 1520. Communication interface 1526 may be configured to facilitate connection 1560 to host computer 1510. Connection 1560 may be direct or it may pass through a core network (not shown in FIG. 13) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 13 may be similar or identical to host computer 1430, one of base stations 1412a, 1412b, 1412c and one of UEs 1491, 1492 of FIG. 12, respectively. This is to say, the inner workings of these entities may be as shown in FIG. 13 and independently, the surrounding network topology may be that of FIG. 12.

In FIG. 13, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the latency of data transmissions and thereby provide benefits such as reduced waiting time, particularly for machine control applications.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 14:
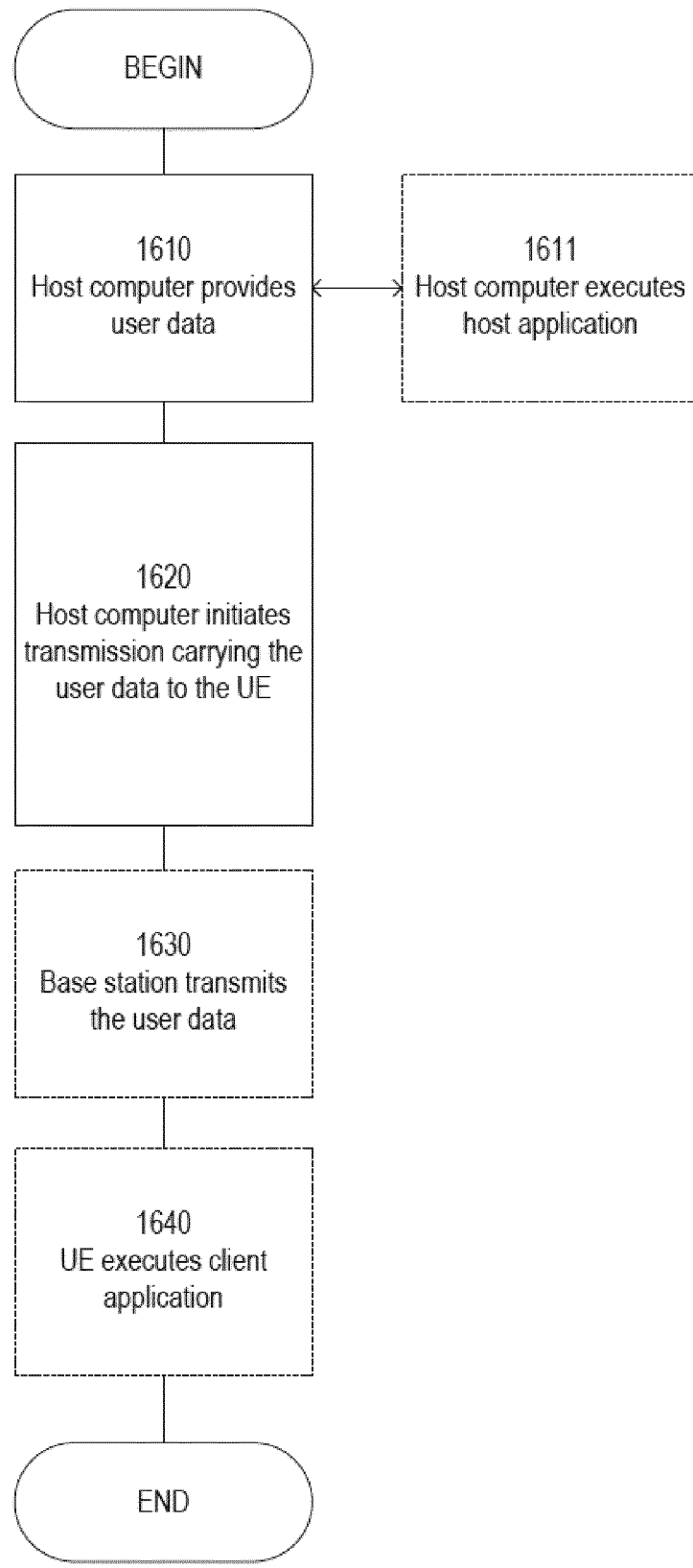
FIGS. 14-17 illustrate an exemplary methods implemented in a communication system, according to an embodiment.

FIG. 14 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 14 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 15:
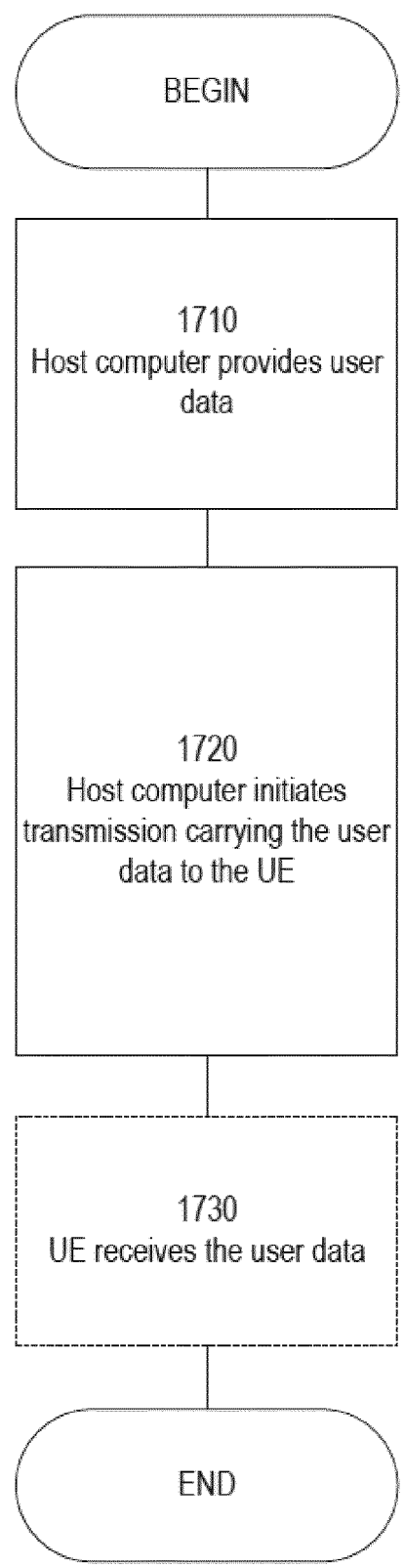

FIG. 15 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 15 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 16:
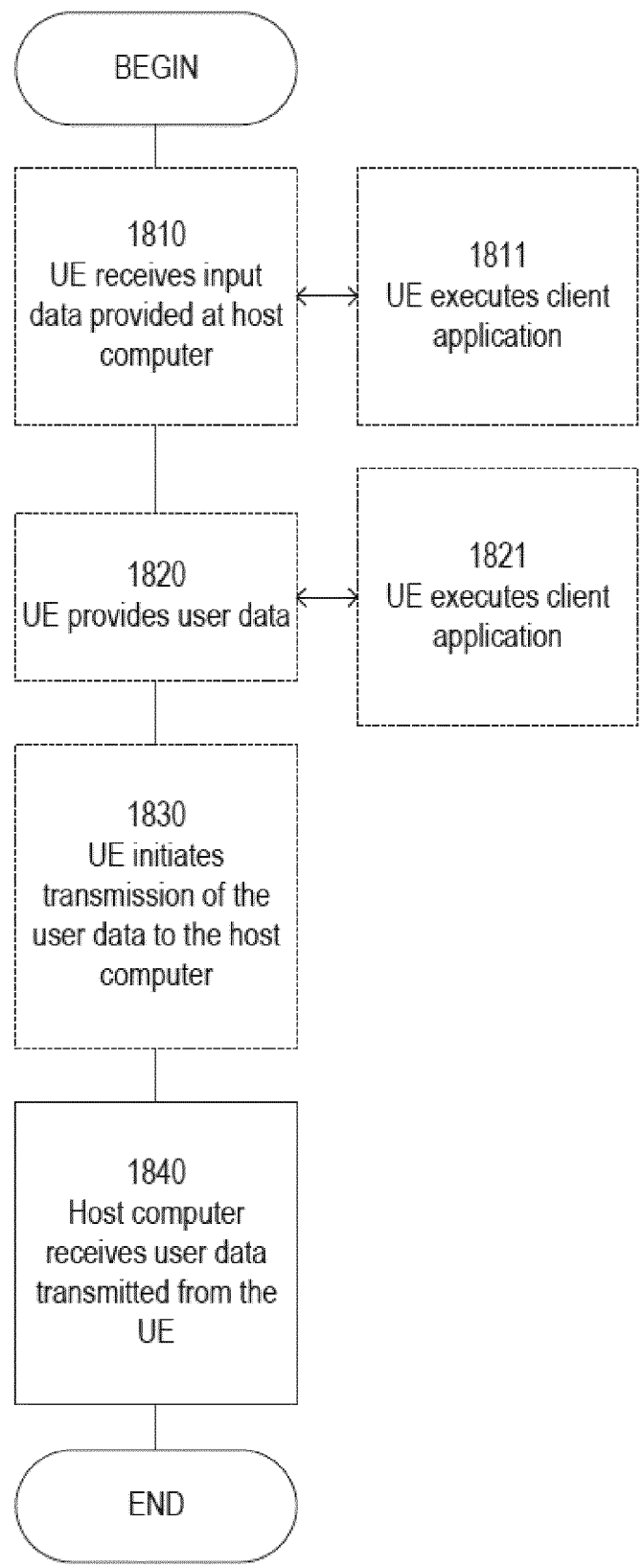

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 17:
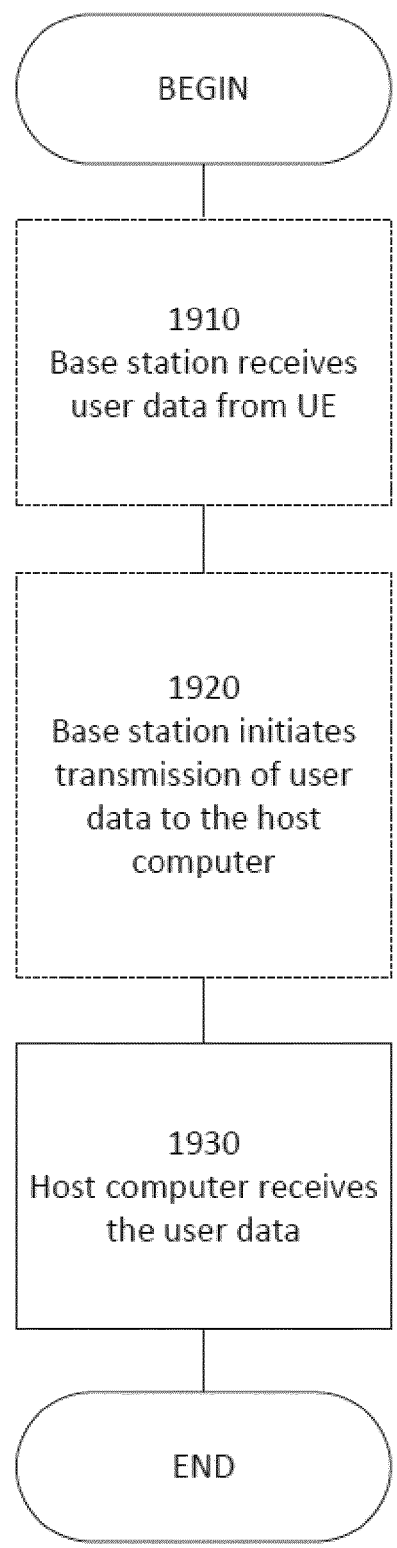

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Additional information may be found in Appendix A, which is incorporated in its entirety by reference.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a user equipment (UE) of reporting channel state information (CSI) to a serving cell, the method comprising:
    receiving downlink transmissions from the serving cell on one or more serving downlink beams of the serving cell;
    sending measurement reports according to a UE-specific CSI configuration for the serving cell, the measurement reports comprising beam link quality indicators for the serving downlink beams in the serving cell and one or more non-serving downlink beams in the serving cell; and
    adapting the CSI configuration used for sending measurement reports depending on a beam link quality of the serving downlink beams in the serving cell,
        wherein adapting the CSI configuration used for sending the measurement reports comprises changing a reporting frequency of the measurement reports for the serving cell based on the beam link quality of the serving downlink beams in the serving cell, and
        wherein changing the reporting frequency of the measurement reports for the serving cell comprises at least one of:
            increasing the reporting frequency of the measurement reports for the serving cell responsive to a deterioration in the beam link quality of the serving downlink beams, or
            decreasing the reporting frequency of the measurement reports for the serving cell responsive to an improvement in the beam link quality of the serving downlink beams;
    responsive to increasing the reporting frequency of the measurements reports in the serving cell, decreasing a reporting frequency of measurement reports for another serving cell to at least partially offset an increase in load due to the increase in the reporting frequency for the serving cell; and
    responsive to decreasing the reporting frequency of the measurement reports in the serving cell, increasing the reporting frequency of the measurement reports in the another serving cell.

2. The method of claim 1, wherein adapting the CSI configuration used for sending the measurement reports comprises:
    comparing a beam link quality indicator for at least one serving downlink beam to a threshold; and
    changing the reporting frequency of the measurement reports based on the comparison.

3. The method of claim 2, wherein changing the reporting frequency of the measurement reports comprises:
    sending the measurement reports at a first reporting frequency when the beam link quality indicator is greater than the threshold; and
    sending the measurement reports at a second reporting frequency greater than the first reporting frequency when the beam link quality indicator is lower than the threshold.

4. The method of claim 1, wherein adapting the CSI configuration used for sending the measurement reports comprises varying a number of non-serving downlink beams of the serving cell for which measurements are reported depending on the beam link quality indicators for the serving downlink beams of the serving cell.

5. The method of claim 4, wherein varying the number of non-serving downlink beams of the serving cell for which the measurements are reported comprises at least one of:
    increasing the number of non-serving downlink beams for which the measurements are reported responsive to the deterioration in the beam link quality of the serving downlink beams; or
    decreasing a number of candidate downlink beams for which measurements are reported responsive to the improvement in the beam link quality of the serving downlink beams.

6. The method of claim 1, wherein adapting the CSI configuration used for sending the measurement reports comprises:
    storing two or more CSI configurations in a memory; and
    selecting an active CSI configuration from the CSI configurations stored in the memory depending on the beam link quality indicators for the serving downlink beams in the serving cell.

7. The method of claim 1, wherein adapting the CSI configuration used for sending the measurement reports comprises:
    receiving, responsive to a change in the beam link quality of the serving downlink beams, control information from the serving cell or the another cell instructing the user equipment to change the CSI configuration; and
    changing the CSI configuration responsive to the receipt of the control information from the serving cell or the another cell.

8. The method of claim 1 further comprising responsive to detection of a beam link failure of a serving downlink beam, prioritizing transmission of the beam link quality indicators for the serving downlink beam for which the failure was detected over the beam link quality indicators of other downlink beams in a same cell group.

9. The method of claim 1, wherein:
the serving cell comprises a secondary serving cell; and
sending the measurement reports comprises sending the measurement reports on an uplink control channel in at least one of a primary serving cell or the secondary serving cell.

10. A method implemented by a base station in a serving cell of the wireless communication network of configuring channel state information (CSI) reporting by a user equipment (UE), the method comprising:
receiving measurement reports according to a UE-specific CSI configuration for the serving cell, the measurement reports comprising beam link quality indicators for one or more serving downlink beams in the serving cell and one or more non-serving downlink beams in the serving cell; and
signaling the user equipment to adapt the UE-specific CSI configuration for the measurement reports depending on a beam link quality of the serving downlink beams,
wherein signaling the user equipment to adapt the UE-specific CSI configuration for the measurement reports comprises signaling the user equipment to change a reporting frequency of the measurement reports depending on the beam link quality of the serving downlink beams of the serving cell, and
wherein signaling the user equipment to change the reporting frequency of the measurement reports comprises at least one of:
increasing the reporting frequency of the measurement reports for the serving cell responsive to a deterioration in the beam link quality of the serving downlink beams, or
decreasing the reporting frequency of the measurement reports responsive to an improvement in the beam link quality of the serving downlink beams, and
wherein responsive to increasing the reporting frequency of the measurements reports in the serving cell, the UE decreases a reporting frequency of measurement reports for another serving cell to at least partially offset an increase in load due to the increase in the reporting frequency for the serving cell; and
wherein responsive to decreasing the reporting frequency of the measurement reports in the serving cell, the UE increases the reporting frequency of the measurement reports in the another serving cell.

11. The method of claim 10, wherein signaling the user equipment to adapt the UE-specific CSI configuration for the measurement reports comprises signaling the user equipment to vary a number of non-serving downlink beams of the serving cell for which measurements are reported depending on the beam link quality indicators for the serving downlink beams of the serving cell.

12. The method of claim 11, wherein signaling the user equipment to vary the number of non-serving downlink beams of the serving cell for which the measurements are reported comprises at least one of:
signaling the user equipment to increase the number of non-serving downlink beams for which the measurements are reported responsive to the deterioration in the beam link quality of the serving downlink beams; or
signaling the user equipment to decrease a number of candidate downlink beam for which measurements are reported responsive to the improvement in the beam link quality of the serving downlink beams.

13. The method of claim 10, wherein signaling the user equipment to adapt the UE-specific CSI configuration for the measurement reports comprises signaling the user equipment to change from a first pre-defined CSI configuration to a second pre-defined CSI configuration.

14. A user equipment in a wireless communication network, the user equipment comprising:
an interface circuit configured for communication with one or more serving cells of the wireless communication network; and
a processing circuit configured to:
receive downlink transmissions from the serving cell on one or more serving downlink beams of the serving cell;
send measurement reports according to a UE-specific CSI configuration for the serving cell, the measurement reports comprising beam link quality indicators for the serving downlink beams in the serving cell and one or more non-serving downlink beams in the serving cell; and
adapt the CSI configuration used for sending measurement reports depending on a beam link quality of the serving downlink beams in the serving cell,
wherein adapting the CSI configuration used for sending the measurement reports comprises changing a reporting frequency of the measurement reports for the serving cell based on the beam link quality of the serving downlink beams in the serving cell, and
wherein changing the reporting frequency of the measurement reports for the serving cell comprises at least one of:
increasing the reporting frequency of the measurement reports for the serving cell responsive to a deterioration in the beam link quality of the serving downlink beams, or
decreasing the reporting frequency of the measurement reports for the serving cell responsive to an improvement in the beam link quality of the serving downlink beams;
responsive to increasing the reporting frequency of the measurements reports in the serving cell, decrease a reporting frequency of measurement reports for another serving cell to at least partially offset an increase in load due to the increase in the reporting frequency for the serving cell; and
responsive to decreasing the reporting frequency of the measurement reports in the serving cell, increase the reporting frequency of the measurement reports in the another serving cell.

15. A base station in a serving cell of the wireless communication network, the base station comprising:
an interface circuit configured for communication with one or more serving cells of the wireless communication network; and
a processing circuit configured to:
receive measurement reports according to a UE-specific CSI configuration for the serving cell, the measurement reports comprising beam link quality indicators for one or more serving downlink beams in the serving cell and one or more non-serving downlink beams in the serving cell; and signal the user equipment to adapt the UE-specific CSI configuration for the measurement reports depending on a beam link quality of the serving downlink beams,
  wherein signaling the user equipment to adapt the UE-specific CSI configuration for the measurement reports comprises signaling the user equipment to change a reporting frequency of the measurement reports depending on the beam link quality of the serving downlink beams of the serving cell, and
  wherein signaling the user equipment to change the reporting frequency of the measurement reports comprises at least one of:
    increasing the reporting frequency of the measurement reports for the serving cell responsive to a deterioration in the beam link quality of the serving downlink beams, or
    decreasing the reporting frequency of the measurement reports responsive to an improvement in the beam link quality of the serving downlink beams, and
  wherein responsive to increasing the reporting frequency of the measurements reports in the serving cell, the UE decreases a reporting frequency of measurement reports for another serving cell to at least partially offset an increase in load due to the increase in the reporting frequency for the serving cell; and
  wherein responsive to decreasing the reporting frequency of the measurement reports in the serving cell, the UE increases the reporting frequency of the measurement reports in the another serving cell.

* * * * *